United States Patent [19]

Ramalingam et al.

[11] Patent Number: 4,927,299
[45] Date of Patent: May 22, 1990

[54] INTEGRAL ACOUSTIC EMISSION SENSOR FOR MANUFACTURING PROCESSES AND MECHANICAL COMPONENTS

[75] Inventors: Subbiah Ramalingam, Roseville; Darrell A. Frohrib, St. Paul, both of Minn.

[73] Assignee: Regents of the University of Minnesota, Minneapolis, Minn.

[21] Appl. No.: 342,723

[22] Filed: Apr. 24, 1989

Related U.S. Application Data

[63] Continuation of Ser. No. 52,788, May 21, 1987, abandoned.

[51] Int. Cl.⁵ ............................................... B23B 27/00
[52] U.S. Cl. ................................... 407/120; 73/862.06; 72/19; 74/DIG. 7
[58] Field of Search ............... 72/2, 5, 19; 407/119, 407/120, 113, 114, 115, 116, 11; 82/1.11, 118, 120, 173, 905; 73/78, 104, 862.06, DIG. 4; 408/134, 187, 194; 310/338; 74/DIG. 7

[56] References Cited

U.S. PATENT DOCUMENTS

| | | | |
|---|---|---|---|
| 2,360,639 | 10/1944 | Asimow | 73/104 |
| 2,457,960 | 1/1949 | Walker | 255/61 |
| 3,240,055 | 3/1966 | Eddens | 72/253.1 |
| 3,948,089 | 4/1976 | Shaw | 73/DIG. 4 |
| 4,620,281 | 10/1986 | Thompson | 73/104 |
| 4,642,617 | 2/1987 | Thomas | 73/104 |
| 4,671,147 | 1/1987 | Komanduri | 73/104 |
| 4,704,895 | 11/1987 | Boing | 73/862.06 |
| 4,744,241 | 5/1988 | Mayer | 73/104 |

FOREIGN PATENT DOCUMENTS

| | | |
|---|---|---|
| 0203490 | 12/1986 | European Pat. Off. |
| 2220237 | 11/1972 | Fed. Rep. of Germany |
| 2906892 | 9/1980 | Fed. Rep. of Germany |
| 3535473 | 4/1987 | Fed. Rep. of Germany |

OTHER PUBLICATIONS

Scott, William R. and Bloomfield, Philip E.; "Durable Lead Attachment Techniques for PVDF Polymer Transducers with Application to High Voltage Pulsed Ultrasoncis", *Ferroelectrics*, 1981, vol. 32, pp. 79–83.

*Primary Examiner*—Frederick R. Schmidt
*Assistant Examiner*—Blynn Shidler
*Attorney, Agent, or Firm*—Kinney & Lange

[57] ABSTRACT

An acoustic emission sensor comprising a piezoelectric material that is integral with a tooling or machine element in which acoustic emissions are to be sensed.

13 Claims, 4 Drawing Sheets

INTEGRAL ACOUSTIC EMISSION SENSOR FOR MANUFACTURING PROCESSES AND MECHANICAL COMPONENTS

This is a continuation of application Ser. No. 052,788, filed May 21, 1987 (now abandoned).

BACKGROUND OF THE INVENTION

1. Field of the Invention

The present invention relates to manufacturing machine or tool elements and mechanical components that have an integrally mounted acoustic emissions sensor to produce a signal indicating operating conditions and parameters.

2. Description of the Prior Art

Manufacture of articles for consumer and industrial use may employ metal removal operations (such as drilling, milling, turning, and grinding), metal forming and primary processes (sheet rolling, sheet forming, drawing, and ironing, in addition to forging and cold forming), as well as joining processes (such as welding). In all of these operations, plastic deformation is invariably involved. It occurs in welding due to solidification shrinkage (small strains). In metal forming and other primary processes, larger shape changes occur which vary with the nature of the specific process (small, medium, and large strains). In metal removal operations, plastic strains imposed can be quite large. Grinding is an example.

Plastic deformation in all crystalline materials involves defect processes traceable ultimately to the "line defects," i.e., crystal dislocations. Shape change or permanent strain is enforced by causing large scale dislocation activity, involving millions of dislocations per $cm^3$ or $inch^3$.

In high strain-rate (high speed) processes, dislocation-lattice interactions involve phonons. Substantial acoustic emission can occur, as, for example, the loud noise accompanying metal fracture. At slower strain-rates, a rich variety of dislocation interactions can occur, accompanied by elastic wave emission (acoustic emission). Many of these phenomena are well discussed in recent publications of workers at the National Bureau of Standards. Among the best known examples of acoustic emission within the audible range is the "cry of tin" caused by twining of individual crystals within a block of tin.

Ceramic and ceramic-like materials (graphite in a lead pencil is an example) also produce substantial acoustic emission as a consequence of elastic energy release accompanying fracture. Large scale analog of this phenomenon are the seismic waves accompanying earthquakes. In this case, the displacements accompanying seismic wave propagation are large enough to be detected by even crude seismometers.

Similar surface displacements accompany acoustic emission in metals and ceramic objects. As noted earlier, they are traceable to dislocation-dependent microscopic processes. The displacements produced are small.

Mechanical components subjected to repeated loading or cyclic stresses eventually fail by metal fatigue. Substantial dislocation activity is known to accompany fatigue damage accumulation. When the accumulating damage processes can no longer be accommodated by internal microscopic changes and atomistic displacement, failure initiation occurs. Subsurface and surface cracking in the microscopic scale, surface pitting and other similar damaging events follow. Each of these failures inducing events is accompanied by acoustic emission.

Once a microscopic or observable crack is formed, continued cyclic stressing or repeated stressing induces bursts of acoustic emission events. Discrete crack growth events and the accompanying elastic energy release are responsible for burst acoustic energy emission.

Acoustic emission sensors have been advanced for mounting on machine tool and mechanical parts for sensing acoustic emissions. Conventionally, these sensors with inertial masses are mounted on a support for the tool or machine element being monitored. This results in mechanical filtering of acoustic emission signals between the mounting interfaces of the tool. Because the acoustic emission signals are relatively low level, and in a relatively high frequency range, the filtering results in the inability to accurately follow the pattern of acoustic emissions from a given tool or machine element. Commercially available sensors are coupled to the objects, generally by pressing the sensor against the surface of the object. Use of rubber bands is common, and sometimes adhesives are used to hold the sensor in place. Of course, any imperfection in the interface between the sensor and the object on which it is mounted also acts as a filter, and thus various coupling agents, such as liquids, are interposed between the sensor and the object. Despite this, transduction efficiency is low, and at the present time the manufacturers of existing acoustic emission detection systems recommend low noise, very high gain amplifier systems. The problems associated with the high gain amplifiers of course include any background noise, and rather complex circuitry for obtaining any type of a usable signal.

The use of piezoelectric material for sensing acoustic emissions is known, but these generally are mounted onto a sensor assembly having an inertial mass. The sensor assembly is mounted onto a support on the manufacturing tool or in the location where acoustic emission sensing is desired. A study of these types of devices is set forth in *Ferro Electrics*, 1981, Volume 32, pages 79–83, in the article entitled "Durable Lead Attachment Techniques for PVDF Polymer Transducers With Application to High Voltage Pulsed Ultrasonics," by Scott et al.

In particular, page 82 of the Scott article shows a response of two different types of sensors including a commercial broad band acoustic emission transducer, and the PVDF sensor under consideration.

Thus, it has been recognized that materials have atomic and intermolecular structures that are subject to shear, and void and discontinuity producing events. When such events occur, they release elastic strain energy in the form of stress waves. These waves propogate through the solid in the forms of acoustic waves, and velocity is determined by the structure and properties of the solid. The acoustic waves may possess frequencies up to several Mhz and are eventually dissipated by transmission reflection and refraction at the boundary surfaces of the solid and by irreversible processes within the solid, such as molecular shifts. Monitoring of these sound wave or acoustic wave changes also gives information about friction conditions between moving surfaces, and similar acoustic wave producing events.

In the prior art, lead zirconate titanate (PZT) detectors with inertial masses are used and they provide for substantial "ringing" at the ends of the signals being received as shown in the Scott article cited above. Additionally, in that article the PVDF (polyvinyldene flouride) piezoelectric polymers were shown to produce a transducer without substantial ringing. Both of these materials are piezoelectric and they can be used for the present integrated acoustic emission sensor that provides real time analyzation of acoustic emissions of a machining tool element.

SUMMARY OF THE INVENTION

The present invention relates to an integrated acoustic emission sensor for real time monitoring of manufacturing processes, utilizing a piezoelectric material sensor coupled directly to the machining tooling element that is desired to be monitored. Use of an inertial mass, as in conventional bulky acoustic emission sensors, is completely dispensed with. The sensor is suitably connected to sensing circuitry for providing an output signal as a function of acoustic emissions in such tooling element.

Preferably, the sensor comprises a tool element having a piezoelectric material deposited thereon to form an integral sensor that will generate electrical signals in response to stress-wave imposed displacements in the part itself. Quartz, PZT and lithium compounds, as well as PVDF can be used for sensor elements. The present sensors do not suffer from the limitations of mechanical interface filtering, or from the need to have complex mounting techniques for the sensors themselves. Need for an additional inertial mass is also eliminated. By eliminating the inertial mass, the bulky conventional A.E. Transducer is replaced with a compact planar transducer, which is easily mounted integrally in tools and mechanical parts.

As shown, the sensor is preferrably deposited directly on the surface of the machine element, such as a disposable cutting tool insert, a tool die or punch, a drawing die, or similar tooling or machine elements. The term "tooling element" includes any type of machine work element that is moved relative to a part being worked upon, which movement results in acoustic vibrations that can be sensed.

Various applications of the integral sensors are shown in the present specification, and of course any desired type of sensing circuitry can be utilized to provide the output signal that can be used for further processing, control, alarms, or the like.

If tool fracture is being monitored, the acoustic sensors of the present invention can also be mounted onto thin metal substrates (without any significant mass) and lightly loaded against the tool as is shown in one form of the invention, to provide indications of actual fracture. Present acoustic emission sensors have significant mass which limits response. The mechanical filtering that occurs using a thin metal strip pressed against the tooling element is not a significant factor, primarily because the sensor is a very low mass system.

Thus, very accurate acoustic emission sensors can be used in a wide variety of applications. Deposited piezoelectric sensors can be used for sensing the breakage of tools or inserts, the break or fracture of the work material being processed by the tool, as well as to detect metal-to-metal contact in a lubricated tool system, such as in a punch where the moving parts generate frictional forces as a function of lubrication. Sensors of this form constructed directly on mechanical components such as gears, cams, roller or ball bearings, etc., allow pitting, wear, micro-cracking and other deterioration processes to also be detected.

Thus, the acoustic emission transducers can be used to sense fracture, cracking, micro-cracking, pitting and friction involved in a process or an operation, as much as changes in friction during processing or mechanical component use.

The piezoelectric acoustic emission sensors are easily deposited in place in batch processes so costs are kept low.

DETAILED DESCRIPTION OF THE PREFERRED EMBODIMENTS

Figure 1:
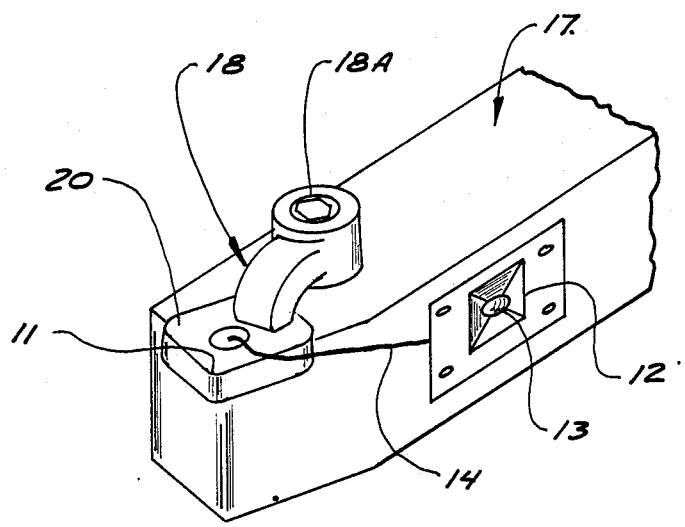
FIG. 1 is a perspective view of a machine or cutting tool support having a disposable cutting insert with sensors made according to the present invention deposited thereon.
Figure 2:
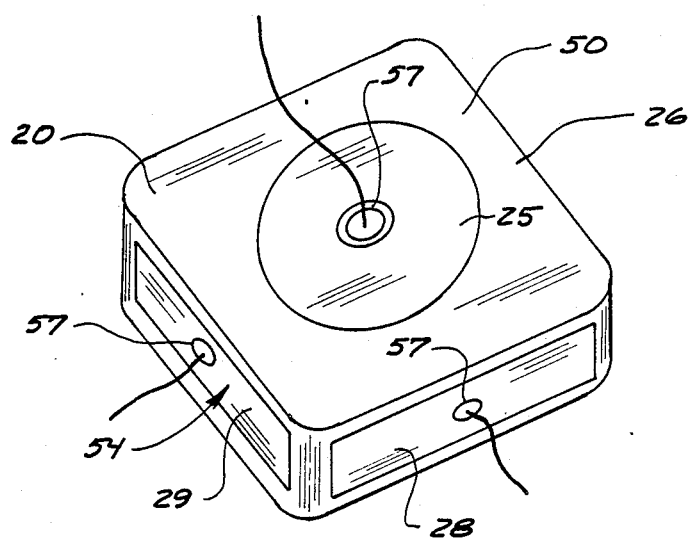
FIG. 2 is a perspective view of a typical cutting tool insert or cutting tool showing integral piezoelectric sensors made according the present invention mounted on the top and side surfaces thereof.
Figure 3:
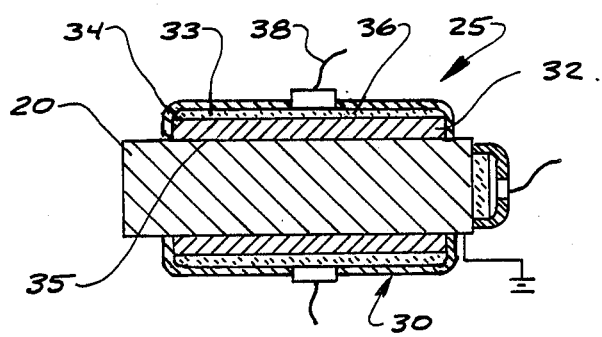
FIG. 3 is an enlarged sectional view of a tool insert as shown in FIG. 2 showing in enlarged scale the construction of the deposited piezoelectric sensors formed thereon.

FIGS. 1–3 show a preferred embodiment of the present sensor on a cutting insert or cutting tool 20 that is made in a conventional manner, and generally rectilinear or circular disc in configuration. Usually such cutting inserts are made of a suitable carbide, ceramic, or high speed steel material. The cutting insert 20 is held in a tool holder 17 with a clamp finger 18, that is held in place with a screw 18A. The cutting insert 20 seats down onto a shoulder surface of the tool holder 17 and is clamped in place with the clamp 18. A corner 11 of the cutting insert 20 can be sharpened for cutting, The cutting edge of the insert 20 can be configured as desired.

The tool holder 17 has a receptacle 12 for receiving and supporting a suitable integrated circuit chip 13 that can include signal conditioning and signal amplification instrumentation for the sensors on the tool insert 20.

An electrical lead such as that shown at 14 can be provided to the circuitry on chip 13. The cutting insert 20 is shown in more detail in FIGS. 2 and 3, and includes a first sensor portion 25 mounted on a surface 26 of the cutting insert 20, and in addition it has sensors 28 and 29 shown on the lateral sides thereof. These sensors can be on any desired surface of the cutting insert, and as shown in FIG. 3 a sensor 30 is positioned on the side of the cutting insert opposite from the sensor 25. Each of the sensors 25, 28, 29 and 30 shown are configured in substantially the same manner. Each sensor includes a deposited layer of piezoelectric material that is the active element. If a thin film piezoelectric layer is to be used, the layer can be deposited by radio frequency sputtering, reactive sputtering or other physical vapor deposition techniques directly on the tool insert surfaces. Radio frequency sputtering, reactive sputtering, and physical vapor deposition techniques which are used for depositing thin film provide atomic level bonding of the deposited film to the underlying surface, as is well known in the art. Suitable masking of course will be provided. The piezoelectric layer can be covered with a deposited conductive layer, so that contacts for taking off signals can be easily connected. Likewise, thick film (silk-screening) technology can be utilized for depositing the layer of piezoelectric material for the sensor. (Also bonding piezoceramic transducer elements onto disposable cutting inserts can be achieved so long as the bond makes the sensor integral therewith.

Each of the sensors is constructed substantially identically and includes a deposited layer of piezoelectric material indicated generally at 32, a conductive layer 33 that is deposited on top of the piezoelectric layer for providing electrical interface, and an insulating protective layer 34 deposited over the conductive layer 33. The cutting insert 20 as shown, when it is working and cutting material, will set up internal elastic wave emissions from a variety of dislocation interactions, and these elastic wave emissions are propagated as sound waves through the cutting insert to the exterior surfaces, where they affect the piezoelectric layer 32 of each of the sensors at the interface 35 of the piezoelectric layer and the cutting insert, the wave compresses the piezoelectric layer and that provides the piezoelectric voltage effect which causes a voltage differential with respect to the interface indicated at 36 between the conductive layer 33 and the piezoelectric layer 32.

As previously explained, the piezoelectric layer can be any desired type of piezoelectric material, including various polymers or oxides. Additionally, the piezoelectric material in layer 32 can be deposited in an internal layer of the cutting tool insert if the cutting insert is constructed in layers. Zinc oxide is one example of a piezomaterial film suitable for constructing integral acoustic emission transducers of the present invention. Aluminum nitride, lithium niobate, PZT, or other desired materials also can be deposited or bonded to the cutting insert.

The sensor layer thickness is substantially enlarged in FIG. 3, and actually is a very thin film. The conductive layer 33 and the insulating layer 34 are also quite thin, so that the cutting tool insert is not substantially enlarged.

If desired, a backing plate can be used on the underside of the cutting insert with an opening so that the sensor 30, for example, will fit in the opening and is not subjected to compressional forces when the cutting insert is clamped into place.

Figure 4:
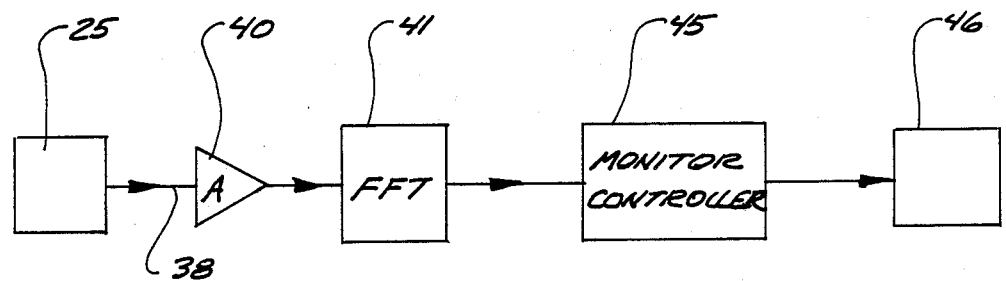
FIG. 4 is a typical block diagram for a circuit useful for analyzing outputs from sensors of the present invention.

The output from the piezoelectric sensor, for example, the sensor 25, is connected through a suitable lead 38 to sensing and processing circuitry. For example, the circuitry can be that shown in the block diagram of FIG. 4. The sensor is represented at 25, and the signal coming along the line 38 is amplified in the first stage amplifier 40, and is fed to a fast Fourier transform analyzer or other suitable analyzer circuitry indicated generally at 41. The output of the analyzer circuitry is provided to a controller 45 that can be used for monitoring a machine tool, for example, or controlling other processes as desired. The controller output along the line 45 can be fed to an actuator 46 or alarm, or a similar output module such as a recorder for recording the acoustic emissions that are sensed. This circuitry is conventional, and is shown by way of illustration only.

Figure 5:
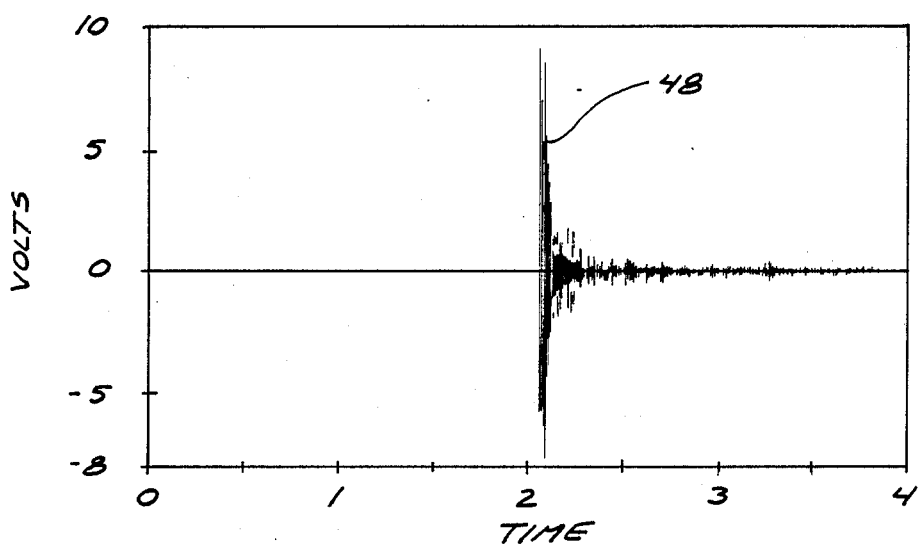
FIG. 5 is a graphical representation of a voltage signal that is delivered from a piezoelectric acoustic emission sensor made according to the present invention at time of a change in conditions at the cutting tool.

Additionally, FIG. 5 is a graphical representation of a typical output from an acoustic emission sensor mode according to the present invention placed on a cutting tool insert such as that shown at 20, and using a deposited zinc oxide film. The plot of FIG. 5 shows time versus output voltage, and the spike shown at 48 is a typical output that is sensed by the piezoelectric transducer during the fracture mode of the tool insert, because of acoustic emissions caused by such fracture.

These outputs from acoustic emission sensors made according to the present invention have been compared experimentally with outputs of standard acoustic emission sensors. The time relationship of the major outputs are identical between commercial acoustic emission sensors and sensors of the present invention which indicates that the acoustic emissions are being sensed by the integral sensors disclosed herein. The present sensors provide a much greater output because of the lack of mechanical filtering due to interfaces and because the sensors are directly associated with the cutting insert or other tooling element that is being monitored. In contrast to the conventional acoustic emission (AE) transducer, the present invention does not use an inertial mass. By dispensing with the mass, a sensitive transducer, compact in size and low in cost, can be constructed on any manufacturing tooling or mechanical component. Scope of AE monitoring for failure/fracture monitoring and detection is greatly expanded.

Figure 6:
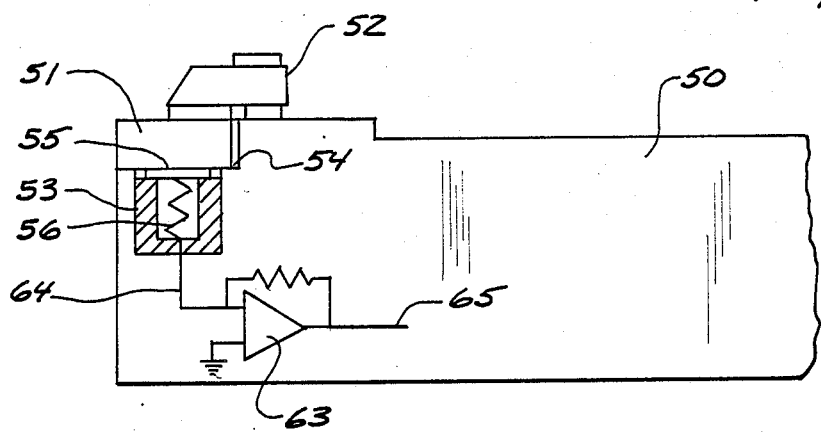
FIG. 6 is a schematic representation of an unbonded, low mass, acoustic emission sensor strip held in place on a cutting tool insert.

A modified form of the invention is shown in FIG. 6, wherein a tool holder 50 has a standard cutting insert or cutting tool 51 mounted thereon. A clamp 52 is used for clamping the cutting tool 51 in place on its support surface. As shown a housing 53 is recessed into a provided receptacle below the support surface 54 of the tool holder, and an acoustic emission sensor assembly indicated generally at 55 is supported with respect to the housing under a biasing load from a light spring 56. The sensor 55 comprises a layer of piezoelectric material deposited onto a very thin metal base that is substantially massless, so that it does not respond to accelerations, but senses acoustic emission. The contact of the piezoelectric material between the surface of the cutting tool 51 and the surface of its mounting strip is such that the acoustic waves in the cutting insert cause a voltage to be generated in the sensor. The sensor is made the same as that shown in FIG. 3 except the layer of piezoelectric material is deposited on a strip of metal instead of the cutting insert. The strip is biased against the insert 51.

Figure 7:
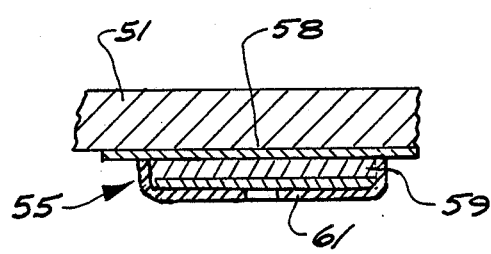
FIG. 7 is a sectional view of the sensor used in the device of FIG. 6.

FIG. 7 is a typical showing of the piezoelectric sensor 55, including a light metal plate 58 that is substantially massless, and a suitable piezoelectric layer 59 deposited thereon. A conductive layer 60 is applied as in FIG. 3, and if desired, an insulative layer 61 may be deposited on the sensor in the same manner as in the first form of the invention. The light spring 56 is made so that is will contact the conducting layer through an opening in the insulative layer 60.

An amplifier 63 can be mounted directly into a tool holder in a provided receptacle, and as shown a lead 64 coupled to spring 56 carries the signals generated by the acoustic emissions acting on piezoelectric layer 59. The signals at the amplifier input are amplified and provided on an amplifier output line 65 to suitable processing circuitry.

This type of sensor 55 will work efficiently only with a low mass base or strip 58. Large mass sensors cause excessive filtering because of acceleration forces on the sensor. The low mass, deposited layer piezoelectric sensor will provide acoustic emission sensing directly from a cutting insert 51 or other machining element.

Figure 8:
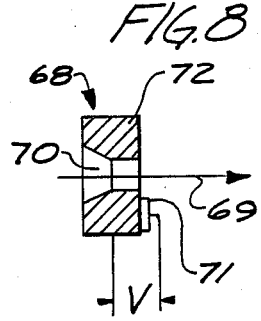
FIG. 8 is a cross-sectional representation of a wire drawing die with a acoustic emission sensor made according to the present invention deposited thereon.

In FIG. 8, a wire drawing die 68 is shown schematically, and is used for drawing a wire along a central axis indicated at 69. The die 68 has a die opening 70 for swaging the wire that is being drawn to the right size. In this form of the invention, the die 68 has an acoustic emission sensor indicated at 71 deposited directly on a surface 72 of the die adjacent to the die opening. The sensor 71 is constructed as shown in FIG. 3, with a piezoelectric layer deposited directly on the die.

The friction between the wire and the die itself will cause vibrations and stress waves to be set up, and these can be sensed as acoustic waves by the sensor 71 using the integral acoustic emission sensing element or sensor deposited directly onto the surface of the die that is being used. A voltage "V" will be generated between leads shown in FIG. 8.

Figure 9:
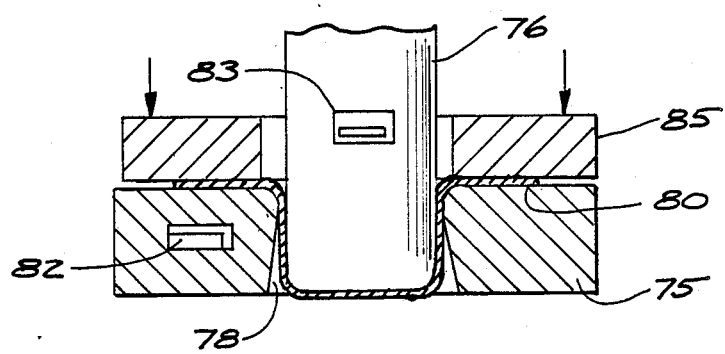
FIG. 9 is a schematic cross-sectional view of a typical deep drawing punch and die set, with acoustic emission sensors made according to the present invention deposited on both the punch and the die for sensing conditions that occur during the deep draw forming operation.

In FIG. 9, a schematic showing of a sheet metal cup forming die 75 is shown. A punch 76 is used for drawing a blank as it is moved through the die. The die 75 has a die opening 78 through which the punch 76 will be pushed for forming a blank indicated generally at 80 into a deep drawn cup or the like.

As the punch 76 pushes the blank 80 through the die opening 78, friction forces generate acoustic emissions that are sensed with a suitable acoustic emission sensor 82 comprising a layer of piezoelectric material deposited directly on the die 75. A second acoustic emission sensor 83 comprises a piezoelectric layer deposited directly on the punch 76. The lubrication between the blank 80 and the surfaces of the die and punch can be determined by sensing the changes in acoustic emissions as the blank 80 is being formed. A hold down or pressure pad is shown schematically at 84 for restraining the outer edge portions of the blank to control the drawing operation. If the friction forces increase because of a lack of proper lubrication between the blank and the surfaces supporting the blank, the acoustic emissions also increase in intensity and in frequency. The acoustic emissions will be accurately sensed without mechanical filtering of the acoustic signals.

Figure 10:
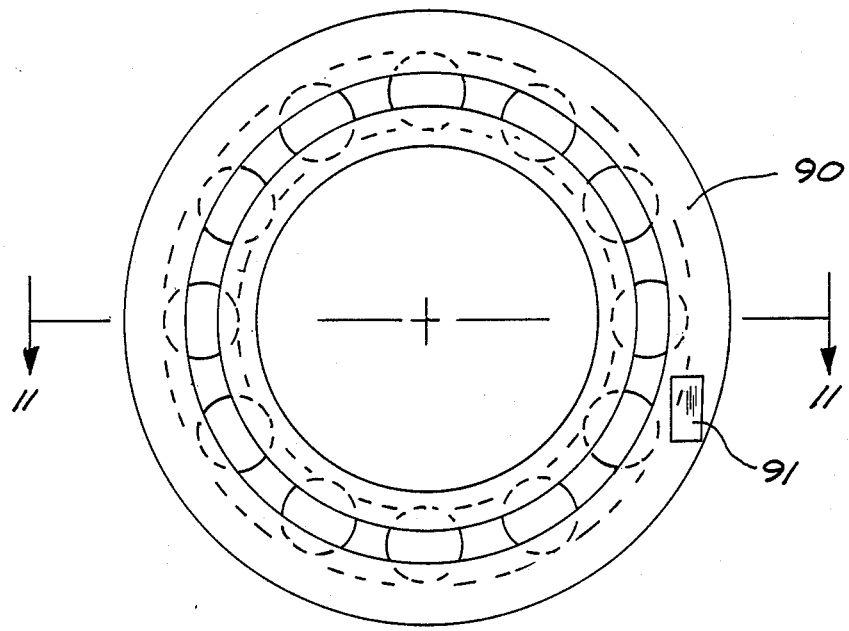
FIG. 10 is a side view of a bearing having a piezoelectric acoustic emission sensor made according to the present invention deposited thereon.
Figure 11:
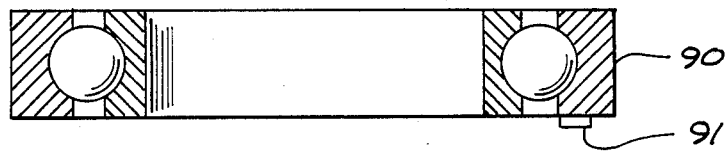
FIG. 11 is a sectional view taken on line 11—11 in FIG. 10.

FIGS. 10 and 11 are views of a mechanical component comprising a bearing 90 that can be either a ball or a roller bearing, with an integral acoustic emission transducer 91 placed thereon. The transducer 91 may be deposited on the peripheral surfaces (circumferential surface of the outer race, or the lateral surfaces of either the inner or outer race) of the mechanical component to monitor frictional conditions, lubrication, cracking and micro-cracking on the ball or roller path. The transducer also can detect pitting of the ball or roller path pitting during operation of this and similar mechanical elements.

The acoustic emission sensor or transducer 91 can be constructed as described before, by directly depositing a layer of piezoelectric material in place and using a conductive film and insulative protective coating.

Figure 12:
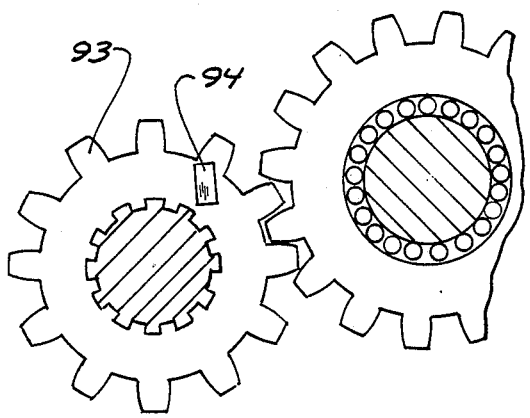
FIG. 12 is a side view of a typical gear component having an acoustic emission sensor made according to the present invention deposited therein.

FIG. 12 is a schematic drawing of a gear component 93 with an integral acoustic emission transducer 94 positioned thereon. As in the case of bearings, acoustic emission transducers are directly deposited on an appropriate non-wearing surface of the gear component. Continuous monitoring enables identification of gear tooth wear, cracking, pitting, and other deleterious events which ultimately lead to component failure. The AE transducer can be applied to cams and other machine elements as well.

The integral sensors can be mounted directly on tooling elements of various configurations, including the use with cutting inserts or cutting tools, punches, dies and the like.

Other metal working tools also can have 25 integral sensors thereon. The integral acoustic emission sensors or transducers may be used to sense breakage of a tool, breakage or fracture of the work material being processed by a tool, as well as to detect conditions of metal-to-metal contact in lubricated tool systems and tool and work piece contact for cutting tool systems.

It should be noted that the sensors shown in FIGS. 6 and 7, for example, having a separate base on which the piezoelectric layer is deposited, are primarily used for high output signals, such as occurs if a tool or metal part being worked would fracture.

The acoustic emission signals obtained from the sensors disclosed herein provide direct information indicating conditions of a machine tooling element. The sensors made according to the present invention give very high response to various phenomena acting on tooling elements. There is no filtering by mechanical interfaces between the tooling elements and their mountings, and thus direct monitoring of conditions can be obtained.

Repetitive or cyclic loading is common in mechanical components. In ball or roller bearings, a point on the raceway at the inner or outer race experiences high Hertz stresses as the ball or roller traverses across that point.

In gears, cams and other machine elements, similar cyclic loading is common. After several thousand to several million loading cycles, fatigue damage accumulation occurs and eventually leads to sub-surface or surface cracking, pitting, and other defects. Formation of these defects is invariably accompanied by acoustic emission.

By constructing the massless, acoustic emission transducers disclosed here, continuous monitoring and detection of failure processes is enabled.

In mechanical systems where failure has catastrophic consequences (aircraft engines, nuclear reactor, etc.), continuous acoustic emission monitoring with conventional AE transducers is common. By disclosing a method of constructing integral transducers and massless transducers, this invention and the use of this invention as an integral part of critical mechanical components enhance the safety in advanced mechanical systems.

Although the present invention has been described with reference to preferred embodiments, workers skilled in the art will recognize that changes may be made in form and detail without departing from the spirit and scope of the invention.

What is claimed is:

1. An acoustic emission sensor for sensing acoustic emissions from a machine element having a first edge which engages another part comprising a thin film piezoelectric material sensor deposited in a layer which is in integral atomic level bonding coupling with a surface of the machyine element after depositing without substantial mass to supporting the thin film piezoelectric layer, the thin film layer being selected to sense emission in the acoustic range and defined by a periphery which is adjacent but spaced from the edge of the machine element; and conductor means coupled to said piezoelectric sensor and to the machine element for sensing outputs in the acoustic emission range generated in said piezoelectric material sensor.

2. The sensor of claim 1 wherein said piezoelectric material is directly deposited onto a surface of the machine element.

3. The sensor of claim 1 wherein said piezoelectric material layer is deposited directly onto the machine element, and an insulating layer overlying said piezoelectric layer.

4. The sensor of claim 1 wherein said machine element comprises a die for forming metal.

5. The sensor as specified in claim 4 wherein said die for forming metal comprises a wire forming die.

6. The apparatus as specified in claim 4 wherein said die comprises a die for deep drawing, and a punch for use in connection with said die, and a separate piezoelectric layer deposited on said punch and coupled to provide an output as a function of acoustic emissions from said punch.

7. The sensor of claim 1 wherein the machine element comprises a mechanical component which produces significant acoustic emission prior to failure thereof.

8. The sensor of claim 1 wherein the machine element comprises of an antifriction bearing element of a mechanical system.

9. The sensor of claim 1 wherein the machine element comprises of a gear of a mechanical system.

10. In combination, a machine tooling element and an acoustic emission sensor for sensing acoustic emissions in the machine tooling element comprising tooling element, a piezoelectric material deposited directly onto a surface of the tooling element in a layer which is in integral contact with the tooling element and of a thickness to respond with voltage changes when subjected to acoustic emissions; and means coupled to opposite spaced surfaces of said layer for sensing voltage outputs caused by signals in the acoustic emission range generated in said piezoelectric material layer.

11. The combinations of claim 1 and a conductive layer deposited over the piezoelectric layer for forming part of the means for sensing voltage outputs.

12. The combination of claim 11 and an insulating layer overlying said conductive layers.

13. The sensor of claim 1 wherein said machine tooling element comprises a cutting insert for cutting metal.

* * * * *

UNITED STATES PATENT AND TRADEMARK OFFICE
CERTIFICATE OF CORRECTION

PATENT NO. : 4,927,299  Page 1 of 3
DATED : May 22, 1990
INVENTOR(S) : Subbiah Ramalingam et al.

It is certified that error appears in the above-identified patent and that said Letters Patent is hereby corrected as shown below: Title page:

In the References Cited Section, under FOREIGN PATENT DOCUMENTS, add the following:

2464764      3/1981      France
WO 88/07911  10/1988     PCT

In the References Cited Section, under OTHER PUBLICATIONS, add the following:

Patent Abstracts of Japan, volume 9, no. 14 (M-352) (1737), 22 January 1985, & JP, A, 59163014 (SUMITOMO DENKI KOGYO K.K.) 14 September 1984

Patent Abstracts of Japan, volume 11, no. 71 (M-567) (2518), 4 March 1987, & JP, A, 61228120 (KOYO SEIKO CO. LTD) 11 October 1986

Patent Abstracts of Japan, volume 7, no. 30 (P-173) (1175), 5 February 1983, & JP, A, 57182161 (MATSUSHITA DENKO K.K.) 9 November 1982

Column 9, line 16, delete "machyine" and insert --machine--.

Column 10, delete lines 17-27 (claim 10) and insert the following:

UNITED STATES PATENT AND TRADEMARK OFFICE
CERTIFICATE OF CORRECTION

PATENT NO. : 4,927,299

DATED : May 22, 1990

INVENTOR(S) : Subbiah Ramalingam et al.

It is certified that error appears in the above-identified patent and that said Letters Patent is hereby corrected as shown below:

10. In combination, a machine tooling element and an acoustic emission sensor for sensing acoustic emissions in the machine tooling element comprising a thin film piezoelectric material sensor deposited directly onto a surface of the tooling element, adjacent an edge of the tooling element that contacts a work piece, but spaced therefrom in an integral layer which is in atomic level bonding contact with the surface of the tooling element to respond with electrical signal changes when subjected to acoustic emissions; and means coupled to opposite spaced surfaces of said layer for sensing electrical signal outputs caused by signals in the acoustic emission range generated in said integral thin film piezoelectric sensor material layer.

UNITED STATES PATENT AND TRADEMARK OFFICE
CERTIFICATE OF CORRECTION

PATENT NO. : 4,927,299

DATED : May 22, 1990

INVENTOR(S) : Subbiah Ramalingam et al.

Page 3 of 3

It is certified that error appears in the above-identified patent and that said Letters Patent is hereby corrected as shown below:

Column 10, line 28, delete "claim 1" and insert --claim 10--.

Column 10, line 33, delete "claim 1" and insert --claim 10--.

Signed and Sealed this

Twenty-fifth Day of February, 1992

Attest:

HARRY F. MANBECK, JR.

*Attesting Officer*     *Commissioner of Patents and Trademarks*